United States Patent [19]
Bousquet et al.

[11] Patent Number: 4,753,909
[45] Date of Patent: Jun. 28, 1988

[54] BRIDGED CLAYS OF IMPROVED THERMAL STABILITY PROCESS FOR THEIR PREPARATION AND UTILIZATION AS CATALYSTS

[75] Inventors: Jacques Bousquet, Irigny; Francois Fajula, Teyran; Francois Figueras, Montpellier; Claude Gueguen, Irigny; Abbas Mattrod-Bashi; Didier Tichit, both of Montpellier, all of France

[73] Assignee: Elf France, Courbevoie, France

[21] Appl. No.: 921,002

[22] Filed: Oct. 17, 1986

[30] Foreign Application Priority Data

Oct. 28, 1985 [FR] France ................................ 85 15993

[51] Int. Cl.$^4$ .......................... B01J 20/12; B01J 21/16
[52] U.S. Cl. ........................................................ 502/84
[58] Field of Search ............................................ 502/84

[56] References Cited

U.S. PATENT DOCUMENTS

| | | | |
|---|---|---|---|
| 3,803,026 | 4/1974 | Jaffe | 502/235 |
| 4,075,126 | 2/1978 | Stridde | 502/84 |
| 4,271,043 | 6/1981 | Vaughan et al. | 502/84 |
| 4,436,832 | 3/1984 | Jacobs et al. | 502/84 |
| 4,515,901 | 5/1984 | Elattar | 502/84 |
| 4,629,713 | 12/1986 | Suzuki et al. | 502/84 |

Primary Examiner—Carl F. Dees
Attorney, Agent, or Firm—Burgess, Ryan & Wayne

[57] ABSTRACT

There are provided clays of laminated structure bridged by metallic oxides selected from oxides of aluminum and zirconium and containing from 10 to 50% and preferably from 20 to 40% of an oxide of the metal of the group of the lanthanides, preferably of cerium. The presence of cerium improves the thermal resistance during a dry calcination or even under humid air. The clays can be used as catalysts during the conversion of hydrocarbons.

10 Claims, No Drawings

BRIDGED CLAYS OF IMPROVED THERMAL STABILITY PROCESS FOR THEIR PREPARATION AND UTILIZATION AS CATALYSTS

SUMMARY OF THE INVENTION

This invention concerns clays of layered structure bridged by metallic oxides which contain an oxide of a metal of the group of the lanthanides, preferably of cerium. The presence of cerium improves the thermal resistance during a dry calcination or even under humid air. These clays can be used as catalysts during the conversions of hyrocarbons.

This invention concerns clays of layered structure bridged by metallic oxides, the preparation thereof and their use as catalysts.

Clays are among the most important constituents of the earth crust. Clays of the smectite type such as bentonite, montmorillonite and beidellite have a layered structure.

The sheet that constitutes the mineral is called dioctahedral, and comprises an octahedral layer of aluminum surrounded by two tetrahedral layers of silicon. The cohesion between the layers is ensured by pooling oxygen atoms.

The layered structure is characterized by interfoliar spacing that is, the distance that separates two layers, or by the basal spacing which represents the sum of the interfoliar spacing and the thickness of a layer.

The interfoliar spacing can be increased by introducing between the layers polar molecules such as water. The thermal stability of the swollen clays thus obtained is not sufficient for allowing their use as catalysts. In fact, at a temperature of about 100° C., the clay expels the polar molecules adsorbed and closes again. The clay layers can be kept separate in a more durable manner by introducing bridges of metallic oxides. These bridges or pillars of metallic oxides are introduced between the layers by means of metallic complexes.

The synthesis of bridged clays has been described in numerous patents and publications.

Grace's U.S. Pat. No. 4,176,090 describes the synthesis of clays bridged by metallic oxides by reacting the clay with an aluminum or zirconium cationic complex in aqueous medium. The interfoliar spacing obtained is between 6 to 16 Angstroms.

Grace's U.S. Pat. No. 4,248,739 is an improvement upon the preceding patent. The aluminum complex is used in polymerized form. The aluminum-bridged clay according to this process maintains from 50 to 90% of its initial surface after heating at 760° C., but only from 50 to 75% after heating at 675° C. in the presence of water vapors.

According to Lahav and Coll. (Clays and Clay minerals 26 107 (1978)), a montmorillonite aqueous suspension is contacted with an oligomer of aluminum hydroxide. The basal spacing of the solid obtained is of 18 Angstroms.

European patent application No. 130,055 of BRITISH PETROLEUM CO. describes the synthesis of clays bridged in an anhydrous medium by reaction with boron trichloride or an organometallic compound.

Finally, European patent application No. 73,718 desribes a bridging method by dialysis of a mixture of an aqueous solution of a metallic hydroxide and an aqueous clay suspension. The thermal stability of the products thus obtained does not exceed 500° C.

BRIEF SUMMARY OF THE INVENTION

The invention provides a new kind of bridged clays of improved thermal stability.

The clays of layered structure that comprise between the layers bridges of oxides of aluminum and/or zirconium according to the invention are characterized in that they contain an oxide of a metal of the lanthanide group. Among the lanthanides there can be mentioned lanthanum, cerium, samarium gadolinium, yttrium and neodymium. Yttrium is considered by F. Cotton and G. Wilkinson (Advanced Inorganic Chemistry—John Wiley (1972) p. 1055) as a metal of the group of the lanthanides. Cerium is preferably used. Yttrium can be considered as a lanthanide and will be included in the phrase lanthanide group as used in the present invention (see F. Cotton and G. Wilkinson, *Advanced Inorganic Chemistry*, John Wiley (1972) p. 1055).

Bridged clays are characterized by their basal spacing determined by X-ray diffraction and by their specific surface measured by the method BET.

Clays bridged according to the invention have a basal spacing between 10 and 30 and preferably between 18 and 25 Angstroms. Their specific surface is between 200 and 500 and preferably, 300 and 400 $m^2/g$.

The thermal stability is determined by the rate of change of the basal spacing and specific surface in the course of heating and/or treatment with vapor.

The clays bridged according to the invention maintains 100% of their specific surface after heating at 500° C. and from 20 to 50% of their specific surface after heating at 800° C. in the presence of water vapors. The basal spacing does not change much when heated at a temperature exceeding 500° C.

For the synthesis of the clays bridged according to the invention, there are used clays of a laminated structure of the family of the smectites such as montmorillonite, bentonite, beidellite, or hectorite.

The process for the preparation of bridged clays comprises impregnating the clay with an aqueous solution of cationic metallic complexes. These complexes are generally formed by hydrolysis of metal salts. The metal salts most commonly used are chlorides and oxychlorides. It is likewise possible to use said complexes in the form of oligomers (U.S. Pat. No. 4,176,090) or polymers (U.S. Pat. No. 4,248,739).

The bridges of metallic complexes formed are transformed to bridges of metallic oxides by heating above 150° C.

It is possible to introduce lanthanides and especially cerium by exchanging part of the cations of an already bridged clay. Between approximately 10 to 50% and preferably between 20 and 40%, of the cations are exchanged between 150° and 300° C.

However, the thermal stability of the bridged clay is better if the cerium and aluminum and/or zirconium in introduced by cohydrolysis that is, starting from a mixed solution containing cerium salts as well as aluminum and/or zirconium salts.

The mixed solution generally contains from 10 to 50%, by mole preferably from 20 to 40%, lanthamide and from 50 to 90%, by mole preferably from 60 to 80%, aluminum and/or zirconium.

The clays bridged according to the invention can be used as catalysts or carriers of catalysts. They can be associated with other clays, zeolites, silica, alumina, magnesia, titanium oxides or mixtures thereof.

The clays bridged according to the invention can be specially used as catalysts for processes of conversion of hydrocarbons such as hydro-treatment, isomerization, reforming or hydrocracking. They are particularly useful as catalysts of catalytic cracking in fluidized bed.

They can be very advantageously used as catalysts in the treatment of the residues of refining such as described by Ritter at the 1981 annual meeting of the NPRA. In this process, the catalyst is subjected to a thermal treatment in the presence of water during which the hydrocarbon residues formed in the course of the reaction undergo a total or partial combustion. But the bridged structure of the clays according to the invention is preserved after heating in the presence of water vapors at the temperatures used in said process.

The examples that follow illustrate the invention but without limiting it.

EXAMPLE 1

A solution of aluminum hydroxide is prepared with a proportion OH/Al=2 by adding drop by drop solution of 0.2M of $AlCl_3 6H_2O$ and NaOH. The pH then is 4.2 400 ml of the NaOH solution are poured into 200 ml of a solution containing 7.73 g $AlCl_3.6H_2O + 0.8$ g $MgCl_2.6H_2O$. This addition is effected three times at 10 minute intervals. Stirring is maintained during the operation. The solution is left to age five days at room temperature. Two samples of 100 g of clays of Volclay having the composition given in Table 1 are finely crushed, dried and dispersed by stirring in demineralized water for 40 minutes. The previously prepared aluminum hydroxide is poured drop by drop for eight hours. When this addition is completed, the aggregate is brought to 60° C. for 2 hours while stirring is maintained. The stirring is then stopped and the aggregate is allowed to return to room temperature and then decanted. The clay is recovered, dried at 60° C., then calcined at 680°–700° C. by spreading it in the form of a thin bed in a quartz tube situtated in a tubular furnace and blown by a current of dry air. An aqueous solution of $K_2CO_3$ is heated to 80° C. and then 10 g of inserted clay is added. After washing, a quantity of $CeCl_3.7H_2O$ corresponding to the exchange capacity of the clay is added at room temperature. The operation is repeated four times. The final washing is effected with hot water.

TABLE 1

|  | INITIAL VOCLAY CLAY Sample | | EXCHANGED Sample | |
|---|---|---|---|---|
|  | 1 | 2 | 1 | 2 |
| $SiO_2$ % by weight | 64.3 | 61.7 | 52.1 | 50.6 |
| $Al_2O_3$ | 24.8 | 20.1 | 40.1 | 39.5 |
| $Fe_2O_3$ | 3.8 | 7.4 | 3.3 | 4.3 |
| CaO | 2.8 | 1.98 | <0.1 | 0.07 |
| $Na_2O$ | 0.4 | 0.2 | 0.2 | — |
| MgO | 1.3 | 3.9 | 4.4 | — |
| $K_2O$ | — | 3.6 | <0.1 | 1.3 |
| $TiO_2$ | 0.06 | 0.87 | — | — |
| Ce | — | — | 1.5 | 2 |

EXAMPLE 2

Three catalysts were prepared in accordance with the procedure described in Example 1. Their main characteristics are summarized in Table 2.

TABLE 2

|  | 1 | 2 | 3 |
|---|---|---|---|
| $SiO_2$ % by weight | 61.7 | 60.5 | 60.6 |
| $Al_2O_3$ | 30.7 | 32.5 | 32.5 |
| $Fe_2O_3$ | 3.1 | 1.3 | 0.3 |
| CaO | <0.1 | <0.1 | <0.1 |
| MgO | 3.9 | — | — |
| $Na_2O$ | 0.2 | <0.1 | <0.1 |
| $K_2O$ | 0.3 | 1.3 | 1.3 |
| Ce | — | 0.15 | 1.6 |
| Surface $m^2 g^{-1}$ | 220 | 260 | 249 |

Catalyst 1 is intercalated (or bridged) only with aluminum. Catalysts 2 and 3 are prepared according to the invention and contain cerium, catalyst 3 being richer in cerium. The catalysts were deactivated with water vapor according to methods known per se. The treatment is effected in glass reactors under a flow of 100% water vapor, and reheated to the desired temperature. The catalysts thus prepared were subjected to a test of catalytic cracking for assessing their activity and their selectivity. This test corresponds to the standard ASTMD 39 07-80. The characteristics of the treated gas oil are set forth in Table 3.

TABLE 3

| Specific Gravity at 150° C. | 0.9226 |
|---|---|
| Sulfur % | 246 |
| Conradson carbon % | 0.29 |
| Refraction index 20° C. | 1.5099 |
| Aniline point °C. | 77.8 |
| Distillation ASTM D11–60 | |
| PI | 272° C. |
| 10% before | 370° C. |
| 50% before | 442° C. |
| 80% before | 491° C. |

Table 4 summarizes the results of catalytic cracking tests as function of the catalysts used and as a function of the temperature of the treatment with water vapor that they have undergone.

TABLE 4

|  | CATALYST | | | | |
|---|---|---|---|---|---|
|  | 1 | 2 | | 3 | |
|  | TEMPERATURE OF VAPOR TREATMENT | | | | |
|  | 600° C. | 600° C. | 650° C. | 600° C. | 650° C. |
| Conversion % by weight | 46.7 | 86.7 | 81.2 | 85.8 | 84.3 |
| Coke | 8.5 | 17.6 | 15.2 | 16.9 | 16.2 |
| $H_2$ | 0.2 | 0.32 | 0.32 | 0.30 | 0.30 |
| $C_1 + C_2$ | 2.5 | 4.59 | 4.11 | 4.4 | 4.1 |
| $C_3$ | 1.1 | 2.95 | 2.54 | 2.9 | 2.7 |
| $C_3^=$ | 0.2 | 4.29 | 4.49 | 4.15 | 4.14 |
| $i\text{-}C_4^=$ | 0.1 | 5.86 | 4.98 | 5.9 | 5.8 |
| $\epsilon C_4$ |  | 4.31 | 5.24 | 4.31 | 4.7 |
| $i\text{-}C_4/\epsilon C_4^=$ |  | 21.39 | 0.95 | 1.37 | 1.23 |
| Total gas | 4.0 | 24.27 | 23.39 | 23.92 | 23.7 |
| Total essence | 14.2 | 44.65 | 43.3 | 44.98 | 44.4 |

The addition of cerium leads to a better resistance of the catalyst to steam.

EXAMPLE 3

From 5 to 10 g of clay of the smectite type were dispersed in 2.5 l of deionized water while stirring for 12 hours. The pH of the aluminum hydroxide solution was adjusted to 6 with ammonium hydroxide. The quantity of aluminum hydroxide solution necessary for obtaining an Al/clay ratio of from 2 to 10 millimoles per gram was added drop by drop, while stirring, to the clay suspension. The solution was then heated to 70°–80° C. After 2 hours, the stirring was discontinued and the preparation was cooled again.

The sediment was recovered, washed and dried at 60° C. during the night. The characteristics of the non-treated clay and of the catalyst obtained are set forth in Table 5.

TABLE 5

|  | CLAY | CATALYST |
|---|---|---|
| $SiO_2$ % by weight | 61.8 | 54.87 |
| $Al_2O_3$ | 19.1 | 30.25 |
| $Fe_2O_3$ | 2.80 | 2.68 |
| CaO | 1.20 | 0.42 |
| $Na_2O$ | 0.20 | 0.10 |
| MgO | 5.90 | 3.93 |
| $K_2O$ | 0.57 | 0.11 |
| $TiO_2$ | 0.53 | |
| $SiO_2/Al_2O_3$ | 3.23 | 1.81 |

The evolution of the surface and the interfoliar distance with the temperature illustrate the stability of this catalyst.

TABLE 6

|  | TEMPERATURE °C. | | | |
|---|---|---|---|---|
|  | 300 | 600 | 700 | 800 |
| Specific surface $m^2g^{-1}$ | 340 | 264 | 213 | 126 |
| d(001) Å | 18.1 | 17.7 | 17.7 | 17.7 |

A second catalyst was then prepared from the same clay by adding to the solution of aluminum hydroxide a quantity of cerium oxide such that the final catalyst contain 1% by weight of cerium. The gain in stability is illustrated by the results set forth in Table 7.

TABLE 7

|  | TEMPERATURE °C. | | | |
|---|---|---|---|---|
|  | 300 | 600 | 700 | 800 |
| Specific surface $m^2g^{-1}$ | 340 | 260 | 254 | 217 |
| d(001) Å | 18 | 17.6 | 17.7 | 17.7 |

Whereas the separation between two sheets is not modified, the loss of surface associated with the increase in temperature is much less.

EXAMPLE 4

The montmorillonites bridged with zirconium can be likewise stabilized by adding cerium to the salt used for the insertion. In this case, 10 g of clay are dispersed in 1 liter of exchanged water, the montmorillonite is made homoionic by exchange for calcium with $CaCl_2.6H_2O$. To this dispersion is added drop by drop in approximately 1 hour the mixture of 170 ml of a fresh 0.1M solution of $ZrOCl_2.8H_2O$ and 85 ml of a fresh 0.1M solution of $CeCl_3$. The aggregate is stirred for 15 hours, then centrifuged. The clay is washed free of $Cl^-$ ions then dried. Several successive exchanges are needed to saturate the montmorillonite and stabilize the structure. The stabilization of the clay is illustrated by the evolution of the interfoliar during the heating of a sample exchanged with zircorium alone and of a sample exchanged with zirconium-cerium.

TABLE 8

|  | CALCINATION TEMPERATURE | | |
|---|---|---|---|
|  | 250° C. | 500° C. | 750° C. |
| Sample: | | | |
| Montmorillonite—Zr | 21 Å | 18 Å | Scratch disappeared |
| Montmorillonite—Zr —Ce | 21 Å | 21 Å | 19 Å |

The table that follows compares the evolution of the specific surface during the heating of three samples:
A=Montmorillonite with 11.6% Zr
B=Montmorillonite with 11.4% Zr+2% CE prepared by exchange by $Ce^{3+}$ ions of the former intercolated sample
C=Montmorillonite with 11% Zr+2.5% Ce prepared by cohydrolysis.

TABLE 9

|  | CALCINATION TEMPERATURE °C. SURFACE $m^2g^{-1}$ | | | | |
|---|---|---|---|---|---|
|  | 250 | 500 | 600 | 700 | 750 |
| Sample | | | | | |
| A | 360 | 260 | 260 | 180 | 80 |
| B | 255 | 200 | — | 195 | 110 |
| C | 270 | 260 | 262 | 230 | 200 |
| C (under 0.5 bar $H_2O$) | 260 | 260 | 202 | 130 | 120 |

The montmorillonite prepared by cohydrolysis of Zr+Ce preserves 80% of its surface in the lower micropores at 20A after calcination under dry air at 700° C., 77% of said surface in the micropores after calcination under dry air at 750° C., and 70% after calcination under humid air (under 0.5 bar $H_2O$) at 750° C. The cohydrolysis provides a solid having a more stable structure and a more considerable separation of the planes and hence a more open porosity. At the same time, the acidity of the solid is at least preserved, since said solids retain the pyridine adsorbed at least up to 500° C.

We claim:

1. A bridged clay or laminated structure having between the layers bridges of at least one metallic oxide selected from the group consisting of oxides of aluminum and zirconium, wherein said bridged clay contains an oxide of cerium.

2. A clay according to claim 1, wherein said bridges of metallic oxides contains an oxide of cerium.

3. A clay according to claim 2 wherein said bridges of metallic oxide comprise from 10 to 50% of an oxide of cerium.

4. A clay according to claim 2 wherein said bridges of metallic oxide comprise from 20 to 40% of an oxide of cerium.

5. A clay according to claim 1 prepared by a process which comprises contacting a clay of layered structure with a composition prepared by cohydrolysis of a solution containing from 10 to 50 mole %, of a cerium salt and from 50 to 90 mole %, of an aluminum and/or zirconium salt, said mole percentage based on the moles of cerium, aluminum and zirconium in the solution.

6. A clay according to claim 2 prepared by contacting a clay of a layered structure of a composition prepared by cohydrolysis of a solution containing from 10 to 50 mole %, of a cerium salt and from 50 to 90 mole %, of an aluminum and/or zirconium salt, said mole percent based on the moles of cerium, aluminum and/or zirconium in the solution.

7. A clay according to claim 5 prepared by contacting the clay of a layered structure with a composition prepared by cohydrolysis of a solution containing 20 to 40 mole % of a cerium salt.

8. A clay according to claim 1 wherein the clay of laminated structure is a smectite type.

9. A clay according to claim 8 selected from the group consisting of bentonite, montmorillonite, beidellite and hectorite.

10. A clay according to claim 9, wherein the clay is selected from the group consisting of bentonite, montmorillonite, beidellite and hectorite.

* * * * *